(12) United States Patent
Kaye et al.

(10) Patent No.: US 11,199,965 B2
(45) Date of Patent: Dec. 14, 2021

(54) VIRTUAL KEYBOARD

(71) Applicant: VERIZON PATENT AND LICENSING INC., Basking Ridge, NJ (US)

(72) Inventors: Joseph Nathaniel Kaye, Mountain View, CA (US); Chris Seonghwan Yoon, Cupertino, CA (US); Danielle Maryse Lottridge, San Francisco, CA (US); Senxuan Wang, San Jose, CA (US); Darren Malcolm Burton, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 77 days.

(21) Appl. No.: 15/394,159

(22) Filed: Dec. 29, 2016

(65) Prior Publication Data

US 2018/0188949 A1    Jul. 5, 2018

(51) Int. Cl.
*G06F 3/0488* (2013.01)
*G09B 13/00* (2006.01)
*G06F 3/023* (2006.01)
*G06F 1/16* (2006.01)
*G09B 21/00* (2006.01)

(52) U.S. Cl.
CPC ........ *G06F 3/04886* (2013.01); *G06F 1/1626* (2013.01); *G06F 3/0238* (2013.01); *G06F 3/04883* (2013.01); *G09B 13/00* (2013.01); *G06F 2203/04809* (2013.01); *G09B 21/008* (2013.01)

(58) Field of Classification Search
CPC ....... G06F 3/04886; G06F 3/02; G06F 3/0233
See application file for complete search history.

(56) References Cited

U.S. PATENT DOCUMENTS

| | | | | |
|---|---|---|---|---|
| 8,326,333 | B2* | 12/2012 | Nyberg | G06F 17/2735 455/414.1 |
| 9,300,645 | B1* | 3/2016 | Rao | G06F 3/017 |
| 10,353,581 | B1* | 7/2019 | Reicher | G06F 3/1446 |
| 2005/0140661 | A1* | 6/2005 | Collins | G06F 3/04886 345/173 |
| 2007/0074131 | A1* | 3/2007 | Assadollahi | G06F 3/0237 715/816 |
| 2010/0052951 | A1* | 3/2010 | Burrell, IV | G06F 3/023 341/23 |
| 2010/0123724 | A1* | 5/2010 | Moore | H04M 1/7243 345/473 |

(Continued)

*Primary Examiner* — Sherrod L Keaton

(57) ABSTRACT

One or more computing devices, systems, and/or methods for facilitating user input are provided. For example, a keyboard display trigger event for a computing device may be identified (e.g., a user interacting with a text input interface). Responsive to identifying the keyboard display trigger event, a virtual keyboard may be displayed through the computing device. The virtual keyboard may comprise virtual keys that are displayed along a periphery/edge of a screen of the computing device, such as side-by-side forming a parallelogram shape. Swipe gestures across the virtual keyboard may be used to transition to other virtual keyboards, such as a letter virtual keyboard, a numeric virtual keyboard, a symbol virtual keyboard, an emoji virtual keyboard, a virtual keyboard in a different language, etc.

20 Claims, 12 Drawing Sheets

(56) References Cited

U.S. PATENT DOCUMENTS

| | | | | |
|---|---|---|---|---|
| 2012/0047454 A1* | 2/2012 | Harte | ............... | G06F 3/04886 715/773 |
| 2012/0127083 A1* | 5/2012 | Kushler | ............. | G06F 3/04886 345/169 |
| 2012/0207527 A1* | 8/2012 | Singhal | ................ | H04M 1/23 400/489 |
| 2013/0135238 A1* | 5/2013 | Naccache | ............ | G09B 21/007 345/173 |
| 2014/0022285 A1* | 1/2014 | Stovicek | ............. | G06F 1/1694 345/650 |
| 2014/0163954 A1* | 6/2014 | Joshi | ................... | G06F 3/0237 704/9 |
| 2014/0173492 A1* | 6/2014 | Yoon | .................. | G06F 3/04886 715/773 |
| 2014/0359473 A1* | 12/2014 | Tang | .................. | H04M 1/0281 715/746 |
| 2015/0149896 A1* | 5/2015 | Radhakrishnan | ... | G06F 17/2735 715/271 |
| 2015/0234593 A1* | 8/2015 | St. Clair | ............ | G06F 3/04886 345/168 |
| 2016/0062633 A1* | 3/2016 | Ahn | ..................... | G06F 3/0489 345/173 |
| 2016/0070464 A1* | 3/2016 | Hong | .................. | G06F 3/0219 715/773 |
| 2017/0060413 A1* | 3/2017 | Singh | .................. | G06F 3/0233 |
| 2017/0351420 A1* | 12/2017 | Rigouste | ............ | G06F 3/04883 |

* cited by examiner

VIRTUAL KEYBOARD

BACKGROUND

Many users may input information into computing devices in order to perform various tasks. For example, a driver may utilize a voice command to invoke a mobile device to initiate a phone call. In another example, a user may compose a text message or email using a virtual keyboard displayed through a display of the mobile device. If the user is going to compose a document, then the user may attach a keyboard or other peripheral to the mobile device, such as a tablet, in order to increase efficiency, speed, and accuracy of input.

Some users, such as a blind person, a driver of a vehicle, a police officer, or military person unable to take their visual concentration and focus away from a target, may have temporary or permanent reduced visibility or an inability to visually see a display of a computing device while inputting information, such as inputting text for a text message. Such a user may spend a substantial amount of time attempting to locate correct virtual keys of a virtual keyboard in order to input corresponding text. The computing device may have an audible aid that provides audible cues as to what virtual keys the user is touching. Even with such audible aids, input through a virtual keyboard having a standard QWERTY layout may still be slow and error prone. Voice recognition input may also suffer from inaccuracies, have privacy issues (e.g., the user may not want other people around the user to know what the user is inputting into a text message), and/or may disturb others around the user.

SUMMARY

In accordance with the present disclosure, one or more computing devices and/or methods for facilitating user input are provided. In an example, a keyboard display trigger event may be identified for a computing device (e.g., a user may interact with a text message input box). A virtual keyboard, comprising virtual keys that are aligned along a periphery/edge of a screen of the computing device, may be displayed. For example, the virtual keys may be aligned side-by-side to form a parallelogram, such as a square or rectangle along an edge of the screen. In an example where the virtual keys are letter virtual keys representing letters of an alphabet, the letter virtual keys may start in a corner (e.g., a top left corner of the screen) or at another location, optionally marked by a notch on a phone case and run counterclockwise from a letter "a" virtual key to a letter "z" virtual key, where a letter virtual key is adjacent to no more than 2 other letter virtual keys (e.g., a letter "b" virtual key is displayed adjacent to and counterclockwise to the letter "a" virtual key and the letter "z" virtual key is displayed adjacent to and clockwise from the letter "a" virtual key). In this way, the virtual keys wrap around the screen and may be easy to locate by a user that is unable to see the virtual keyboard (e.g., a blind user may run a finger along the edge of the computing device, such as along a mobile phone case having notches to help orient the user as to a current location of the finger along the virtual keyboard, in order to locate desired virtual keys).

In an example, a set of keyboard layouts, corresponding to different key sizes (e.g. various sizes may be specified for individual virtual keys, and the sizes of the activation areas of those keys may differ from the displayed key) and/or different key locations (e.g., an order and/or arrangement of virtual keys). A preferred keyboard layout may be chosen by the user, or the layout may be optimized for a particular situation. For example, the probability of using certain letters may be higher when writing a text message to a spouse compared to writing an email to a client, when writing a text message instead of writing an email, or when writing in a particular language may, which may change the set of most frequently used letters. Thus, the preferred keyboard layout may be chosen according to those probabilities. The probabilities may be calculated based on input of that particular user, that particular user's particular usage pattern (such as writing to their particular spouse), or may be calculated on the basis of probabilities of a larger set of people writing to, say, their spouse.

The user may utilize a gesture (e.g., a multi-finger swipe, such as a 3 finger swipe) across the virtual keyboard in order to transition to a different virtual keyboard. For example, the virtual keyboard may comprise letter virtual keys from "a" to "z". The user may perform a swipe gesture to transition from the virtual keyboard to a second virtual keyboard, such as a symbol virtual keyboard or a numeric virtual keyboard. In an example, a user may utilize an accessibility action feature to change between virtual keyboards. For example, the user may swipe up and down in order to listen to keyboard options. The user may double tap on a desired virtual keyboard in order to transition display to that desired virtual keyboard.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
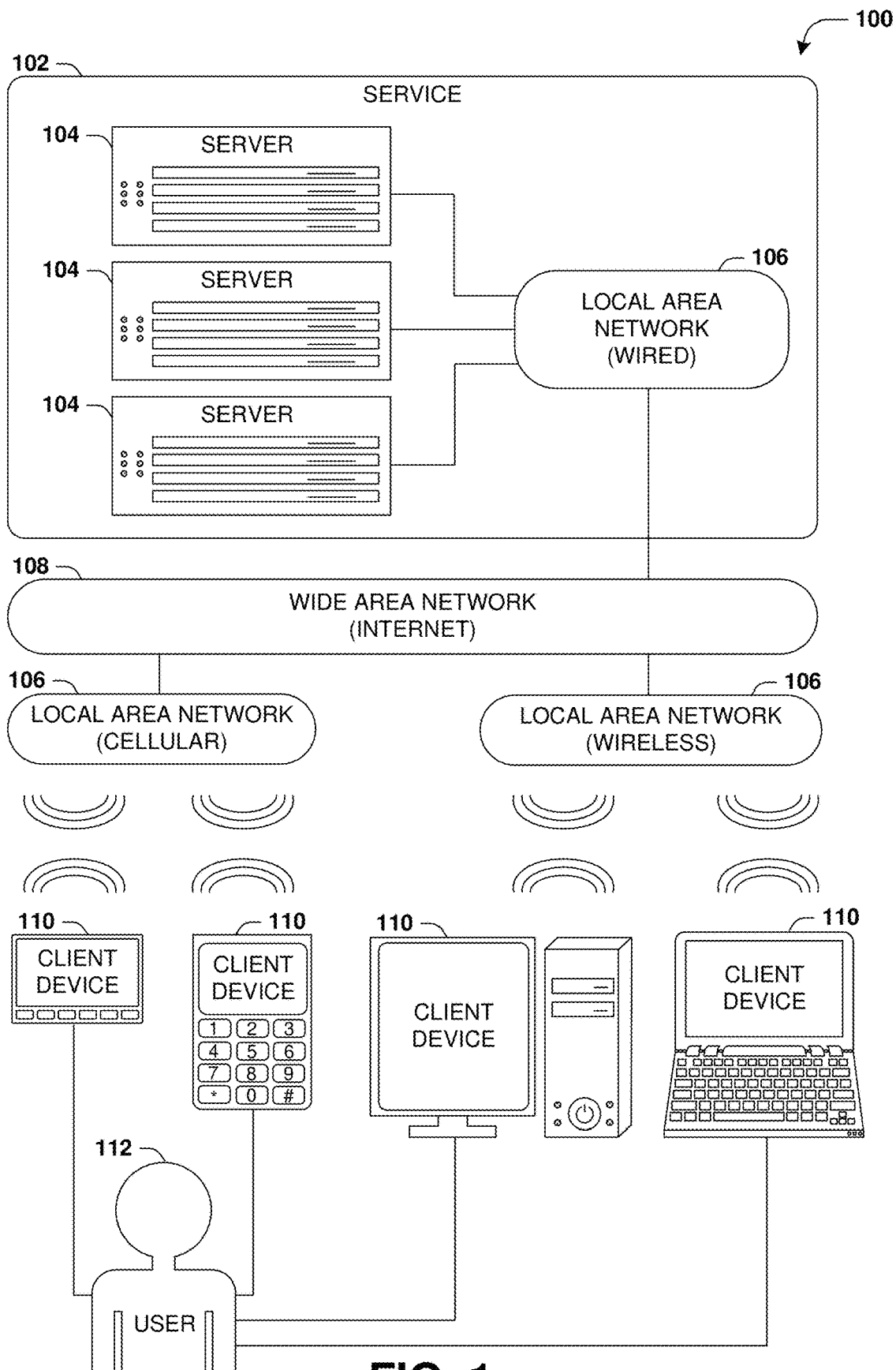
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
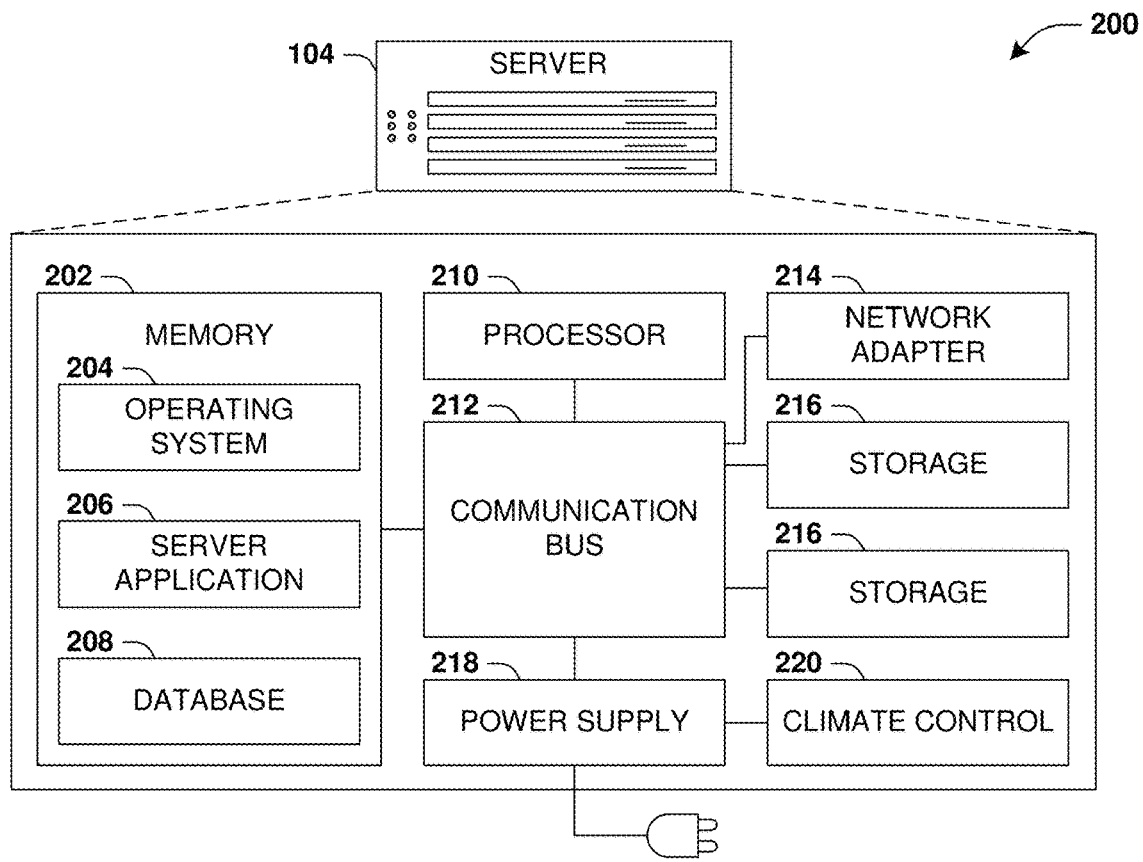
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
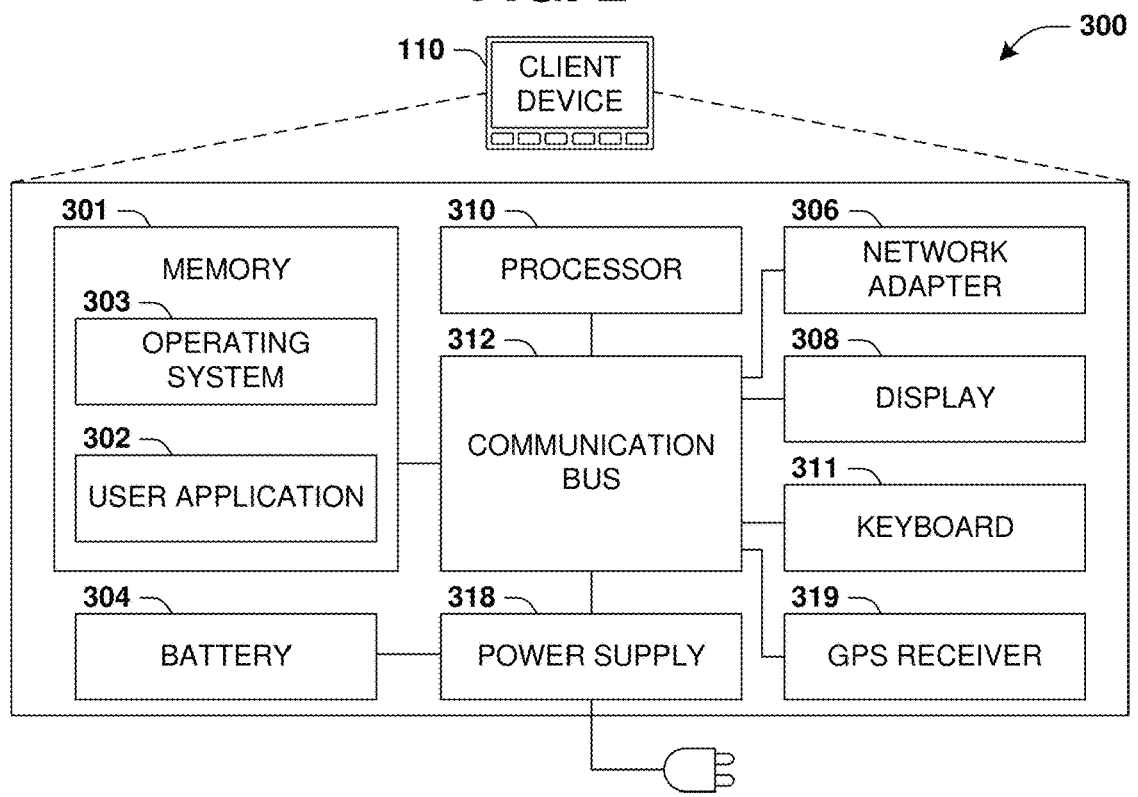
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for facilitating user input are provided. Many users may have visual impairments (e.g., a blind person) and/or there may be situations where a user is unable to devote adequate amounts of visual attention to a screen of a device (e.g., a police officer or military person may have an urgency to send a text message but may be unable to take their visual concentration and focus away from a target). Current virtual keyboard layouts, such as a QWERTY layout, may provide for cumbersome, slow, inefficient, and/or inaccurate user input. Voice command input may also be inaccurate, have privacy issues, and/or disturb other people within audible range of the user.

Accordingly, as provided herein, a virtual keyboard having an optimized virtual keyboard layout is provided for improving user input efficiency, user input speed, and user input accuracy. For example, the virtual keyboard may comprise letter virtual keys that wrap around a periphery/edge of a screen of a computing device. The letter virtual keys may start in a corner, such as a top left corner, and wrap side-by-side counterclockwise around the periphery to form a parallelogram (e.g., a rectangle) starting at a letter "a" virtual key or any other virtual key and ended at a letter "z" virtual key or any other virtual key. In this way, the user may run their finger along the edge of the computing device in order to locate a particular virtual key. In an example, a computing device case (e.g., a mobile phone case, a tablet case, etc.) is provided with notches along the periphery to aid the user in identifying where particular virtual keys are located (e.g., notches may be made at each corner and one or more notches may be made along each side of the computing device case such as at midway points between corners).

A swipe gesture across the virtual keyboard may transition the user to a second virtual keyboard, such as a virtual keyboard comprises symbols or numbers. The position of letter virtual keys, symbol virtual keys, and/or numeric virtual keys within a virtual keyboard may be determined based upon a frequency of character use, which may be particular to a certain situation (e.g., certain letters may be used more often than others when writing a text message to a spouse compared to writing a client email). Various corpora of text may be evaluated to identify such character usages frequencies and trends. Virtual keys for more frequently used characters may be placed in locations that are easier to locate for users that are not able to visible concentrate on the screen, such as being located at corners of the screen and/or a bottom middle portion of the screen that may be proximate to a mobile device input (e.g., a home button).

Figure 4:
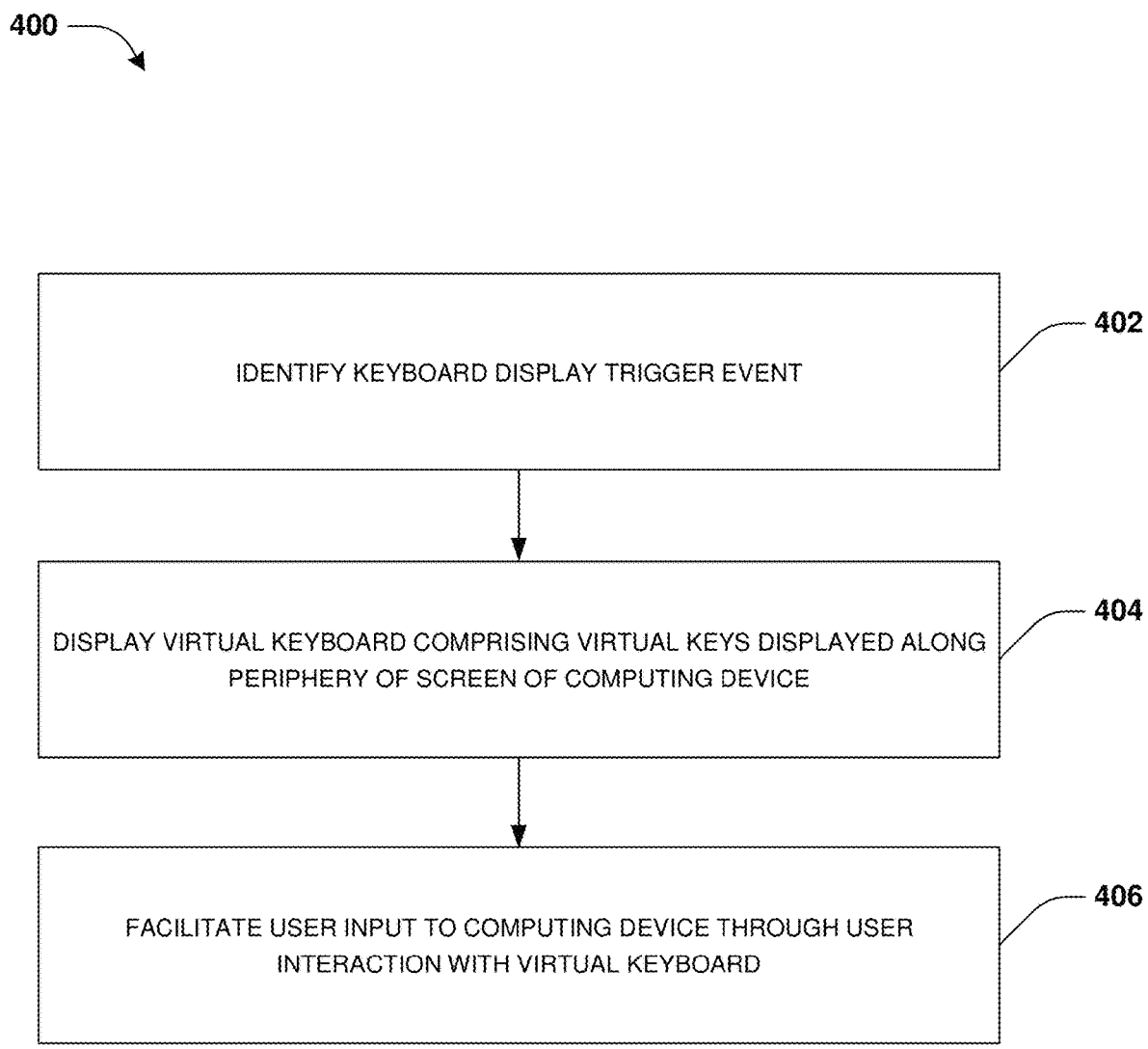
FIG. 4 is a flow chart illustrating an example method for facilitating user input.

An embodiment of facilitating user input is illustrated by an example method 400 of FIG. 4. At 402, a keyboard display trigger event for a computing device may be identified. For example, a user may interact with a social network post input interface through a social network app of a mobile device. At 404, a virtual keyboard may be displayed. The virtual keyboard may comprise virtual keys that are aligned along (wrapped around) a periphery/edge of a screen of the computing device. In an example, the virtual keys may be positioned side-by-side along the periphery to form a parallelogram, such as a rectangle, having a substantially similar shape as the screen of the computing device.

In an example, the virtual keys comprise letter virtual keys representing letters of an alphabet. The letter virtual keys may be positioned along the periphery of the screen such that a letter virtual key is adjacent to two other letter virtual keys (e.g., a letter "c" virtual key may be adjacent to a letter "b" virtual key on one side and a letter "d" virtual key on the other side of the letter "c" virtual key). In an example, the letter virtual keys may be placed along the parallelogram according to an order of letters in the alphabet (e.g., letter virtual keys may be ordered from starting at the letter "a" virtual key and ending at a letter "z" virtual key). It may be appreciated that virtual keys, such as the letter virtual keys, may be placed in any desired order and are not limited to sequential alphabet or numeric orderings.

In an example, virtual keys may be placed based upon a frequency of character usage. For example, a number of letter virtual keys that are placed along a first side, a second side, a third side, and a fourth side of the parallelogram may be determined so that certain letter virtual keys may be positioned in easy to locate and access positions such as corners of the screen and/or a bottom middle portion (e.g., a portion near a button of the computing device such as near a home button; a middle portion of whichever side is facing towards Earth, which may be determined based upon a screen orientation metric or a sensor such as a gyroscope, a compass, etc.).

A first corner, a second corner, a third corner, a fourth corner, and/or a bottom middle portion of the parallelogram may be designated for virtual keys corresponding to characters having frequencies of character usage greater than a threshold (e.g., if the user is composing a text message, then frequencies of character usage, determined from a corpus of text messages, may be used to determine which letters are more frequently used than other letters when composing text messages). For example, the letters "a", "e", "n", "r", "i", and "j" may be the most frequently used letters when composing a text message (e.g., different letters may be more frequently used when composing an email or creating a social network post). Accordingly, a size of virtual keys, a number of virtual keys per side of the parallelogram, and/or other configuration of the virtual keyboard may be dynamically determined so that the letters "a", "e", "n", "r", "i", and "j" are positioned at the first corner, the second corner, the third corner, the fourth corner, and/or the bottom middle portion because such areas of the screen may be easy to locate and/or access when a user is unable to see or visually concentrate on the screen.

In an example, a user interface (e.g., a social network app, a text message app, a web browser, etc.) may be visible within a portion of the screen surrounded by the parallelogram of the virtual keyboard. In this way, the user can see both the user interface and the virtual keyboard. In another example, a space virtual key, an enter virtual key, and a delete virtual key corresponding to space, enter, and delete typing functions may be populated in at least some of the portion of the screen surrounded by the parallelogram (e.g., populated within the entire portion such that the user interface is not visible or populated within merely a section of the portion so that the user interface is still visible).

In an example, a set of keyboard layouts for the virtual keyboard may be maintained. A keyboard layout may specify a shape for the virtual keyboard (e.g., a parallelogram, a circle, a rectangle, a cross, etc.), a size of virtual keys (e.g., a display size for individual virtual keys, where more frequently accessed characters may be represented by larger virtual keys than virtual keys representing other characters), a particular order of virtual keys (e.g., a sequential order from a letter "a" virtual key to a letter "z" virtual key or some other order of letters, numbers, and/or symbols), particular locations of virtual keys within the virtual keyboard (e.g., placement of virtual keys for frequently accessed characters may correspond to easier to locate locations such as at corners of the screen of the computing device), etc. Keyboard layouts may be designated for certain situations where different characters may be more frequently used for a particular situation than other situations (e.g., a particular symbol may be more frequently used in social network posts than emails; a particular number may be used more in emails to a particular client than emails to a spouse; a user having a nursing job may use certain letters than users having other occupations, etc.).

In an example, user signals of the user may be evaluated to identify a user keyboard preference (e.g., a likelihood that certain characters will be more frequently used than other characters). The user signals may correspond to a recipient of a message, a user profile of the user, an application type of an application through which the user is inputting information using the virtual keyboard, a job type of the user (e.g., a veterinarian, a nurse, and a plumber may individually use different sets of characters more frequently than one another), a time of day (e.g., the user may more frequently use a "!" symbol in the evening after 10 pm or on Fridays), a location of the computing device (e.g., the user may utilize different symbols, letters, and/or numbers while at work than when at home), and/or any other information that may be indicative of circumstances that may affect which characters the user will use more frequently than other characters. In this way, a target keyboard layout may be selected based upon the user keyboard preference, such as based upon the recipient, the application type, the job type, etc. The target keyboard layout may be dynamically applied to the virtual keyboard for display through the computing device.

At 406, user input to the computing device may be facilitated through user interaction with the virtual keyboard. In an example, a predicted next character that will be inputted by the user may be identified, and a corresponding virtual key may be enlarged (e.g., a color may be changed or any other indicator may be provided) to aid the user in locating the virtual key (e.g., word and pattern recognition, auto complete functionality, and/or other functionality may be used to predict the next character). In an example, a press gesture may be used to change a letter virtual key from representing a lower case letter to an upper case letter (e.g., a press gesture exceeding a threshold timespan or pressure threshold, such as a long press gesture).

Various types of virtual keyboards may be maintained so that the user can easily switch between numeric virtual keyboards, symbol virtual keyboards, emoji virtual keyboards, virtual keyboards of varying languages, and/or other types of keyboards with simple inputs, such as a swipe gesture across the screen such as across at least some of the virtual keyboard (e.g., a three finger swipe across a currently displayed virtual keyboard may be detected as a switch virtual keyboard event without triggering character input from the swipe gesture touching one or more virtual keys).

In an example, a swipe gesture across the virtual keyboard may be received while the virtual keyboard is a letter virtual keyboard comprising letter virtual keys representing letters of an alphabet. Display of the letter virtual keyboard may be transitioned from the letter virtual keyboard to a second virtual keyboard such as a numeric virtual keyboard comprising numeric virtual keys representing numbers. The second virtual keyboard may have a similar shape, size, number of virtual keys, and/or configuration as the virtual keyboard or may have a different shape, size, number of virtual keys, and/or configuration.

In another example, a swipe gesture across the virtual keyboard may be received while the virtual keyboard is the letter virtual keyboard or a different virtual keyboard such as the numeric virtual keyboard (e.g., a swipe right gesture may transition to the numeric virtual keyboard while a swipe left gesture may transition to a different virtual keyboard such as a first symbol virtual keyboard). Display of the virtual keyboard may be transitioned from the virtual keyboard to a second virtual keyboard such as a first symbol virtual keyboard comprising a first set of symbol virtual keys representing a first set of symbols. The second virtual keyboard may have a similar shape, size, number of virtual keys, and/or configuration as the virtual keyboard or may have a different shape, size, number of virtual keys, and/or configuration. Responsive to receiving a second swipe gesture across the second virtual keyboard (e.g., a second swipe left gesture, a swipe down gesture, a swipe up gesture, etc.), display of the second virtual keyboard may be transitioned to a third virtual keyboard comprising a second symbolic virtual keyboard comprising a second set of virtual keys representing a second set of symbols (e.g., where at least one virtual key of the second set of virtual keys is different than a virtual key of the first set of virtual keys). The third virtual keyboard may have a similar shape, size, number of virtual keys, and/or configuration as the second virtual keyboard or may have a different shape, size, number of virtual keys, and/or configuration.

Swipe gestures may also be used to transition to other types of virtual keyboards, such as an emoji virtual keyboard comprising emoji virtual keys representing emojis, a second letter virtual keyboard comprising letter virtual keys correspond to a different alphabet/language, etc.

In an example, user feedback, regarding usage of the virtual keyboard, may be received. The user feedback may correspond to a typing speed of the user, accuracy of the user, frequency of character usage, etc. The user feedback may be used to adjust a layout of virtual keys of the virtual keyboard (e.g., an infrequently used virtual key may be moved to a less accessible position within the virtual keyboard, while a more frequently used virtual key may be moved to a more accessible position within the virtual keyboard). In an example, a new virtual keyboard layout may be created based upon the user feedback.

In an example, a training mode may be enabled for the virtual keyboard in order to help the user familiarize themselves with the virtual keyboard. For example, the user may be instructed to input a set of training phrases utilizing different sets of virtual keys (e.g., the user may be instructed to input: ear, ran, pen, pan, don, one, name, cab, cap, rob, ink, bin, job, jib, rust, stir, stop, went, tony, etc. in order to cover the user accessing different regions of the virtual keyboard).

Figure 5:
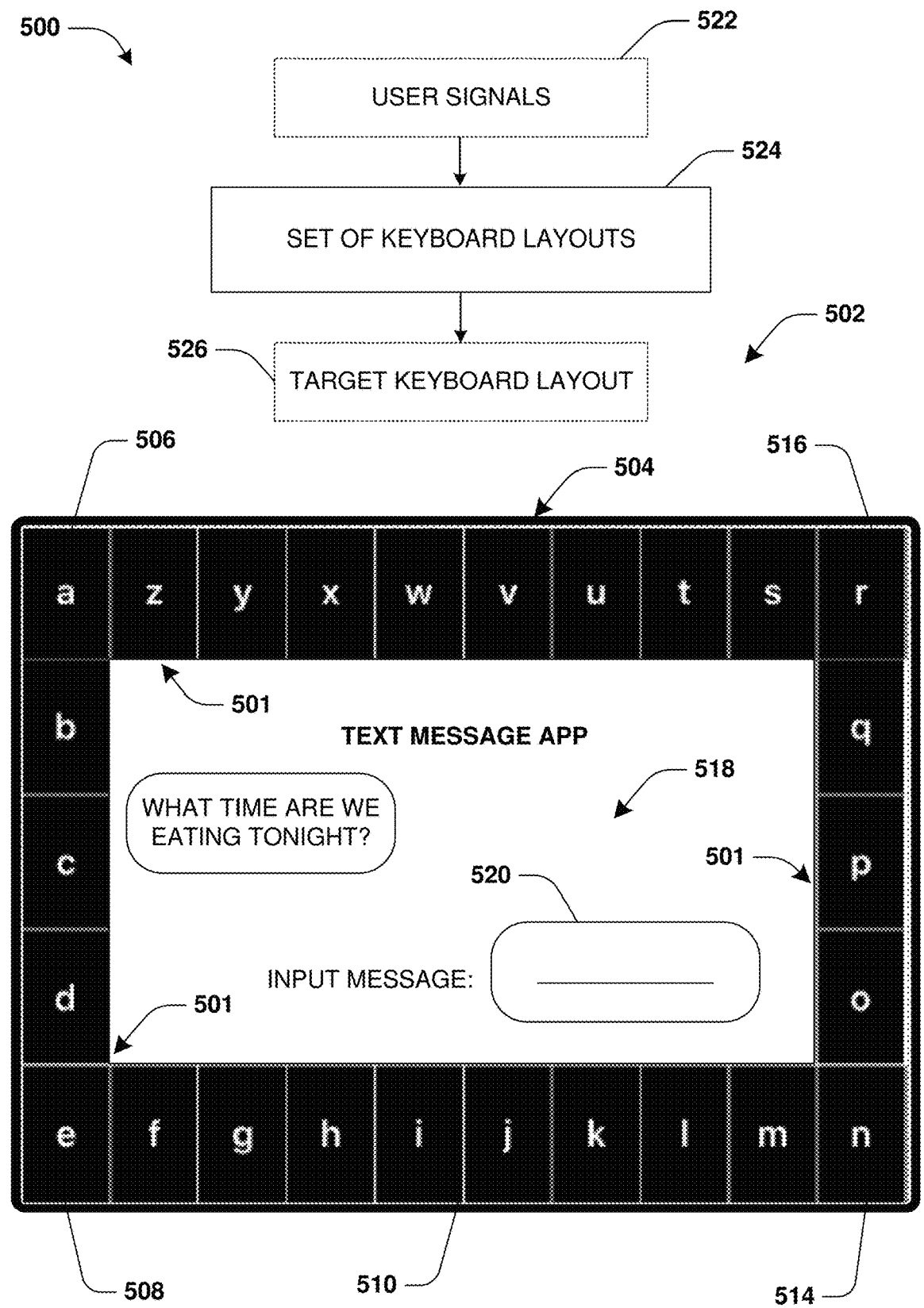
FIG. 5 is a component block diagram illustrating an example system for facilitating user input where a target keyboard layout is applied to a virtual keyboard.

FIG. 5 illustrates an example of a system 500 for facilitating user input. For example, a user may access a text message app 518 displayed through a screen 504 of a computing device 502. A keyboard display trigger, such as the user interacting with a text input interface 520 of the text message app 518, may be identified. Accordingly, user signals 522 of the user (e.g., identification of a spouse as a message recipient) may be used to identify a target keyboard layout 526 from a set of keyboard layouts 524. The target keyboard layout 526 may be applied to a virtual keyboard 501 that is displayed through the screen 504 based upon the keyboard display trigger. The target keyboard layout 526 may specify sizes and locations for individual virtual keys, a shape for the virtual keyboard 501, and/or other configuration (e.g., a number of virtual keys along a first side, a second side, a third side, and a forth side of the virtual keyboard 501, such as 5 virtual key from "a" to "e" along the first side, 10 virtual keys from "e" to "n" along the second side, 5 virtual keys from "n" to "r" along the third side, and 10 virtual keys from "r" to "a" along the fourth side).

In an example, the virtual keyboard 501 comprises letter virtual keys that are aligned along a periphery of the screen 504 to form a parallelogram around the text message app 518. The letter virtual keys may be populated starting at a first corner 506 of the parallelogram with a letter "a" virtual key, and proceed in a counterclockwise direction in an increasing sequential order of the alphabet ending at a letter "z" virtual key. In this way, frequently used characters such as "a", "e", "i", "j", "n", and "r" may be positioned in easy to find and access locations, such as the first corner 506, a second corner 508, a middle bottom portion 510 (e.g., the middle bottom portion may dynamically change to different sides of the parallelogram based upon an orientation of the computing device 502), a third corner 514, and a fourth corner 516. It may be appreciated that the letter virtual keys may be ordered according to any ordering and are not limited to an order that follows a sequential order of letters of an alphabet.

Figure 6:
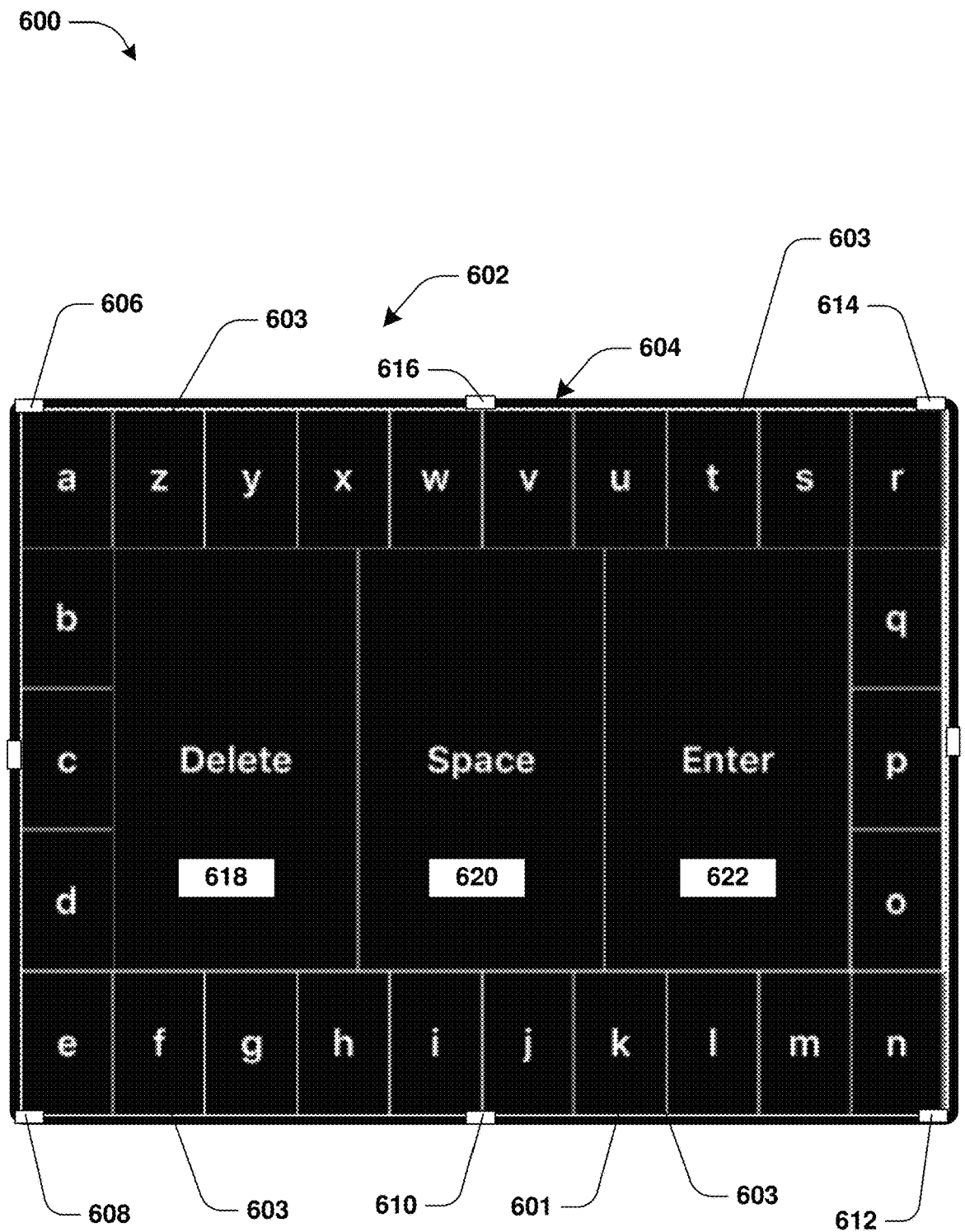
FIG. 6 is a component block diagram illustrating an example system for facilitating user input where a virtual keyboard is displayed with letter virtual keys displayed along a periphery of a screen of a computing device.

FIG. 6 illustrates an example of a system 600 for facilitating user input. For example, a user may access a social network app displayed through a screen 604 of a computing device 602. A keyboard display trigger, such as the user interacting with a social network post creation interface of the social network app, may be identified. Accordingly, a virtual keyboard 603 may be displayed. The virtual keyboard 603 may be populated with letter virtual keys that are positioned along a periphery/edge of the screen 604 in the shape of a rectangle. A delete virtual key 618, a space virtual key 620, and an enter virtual key 622 may be displayed within the rectangle. It may be appreciated that such keys may be displayed in various locations, orders, and/or sizes (e.g., the delete virtual key 618, the space virtual key 620, and the enter virtual key 622 may be displayed smaller so that the user can see the social network app).

In an example, a computing device case 601 is provided. The computing device case 601 may be formed to fit around the computing device 602, such as a smart phone, a smart watch, a tablet, etc. The computing device case 601 may comprise notches, such as a first notch 606, a second notch 608, a third notch 610, a fourth notch 612, a fifth notch 614, a sixth notch 616 and/or other notches that can be used as indicators for a user as to where a finger is in relation to the virtual keyboard 603. For example, a blind user may be able to run their finger along the edge of the computing device case 601 in order to locate and feel notches used to orient the user to a current location of their finger with respect to the virtual keyboard 603.

Figure 7:
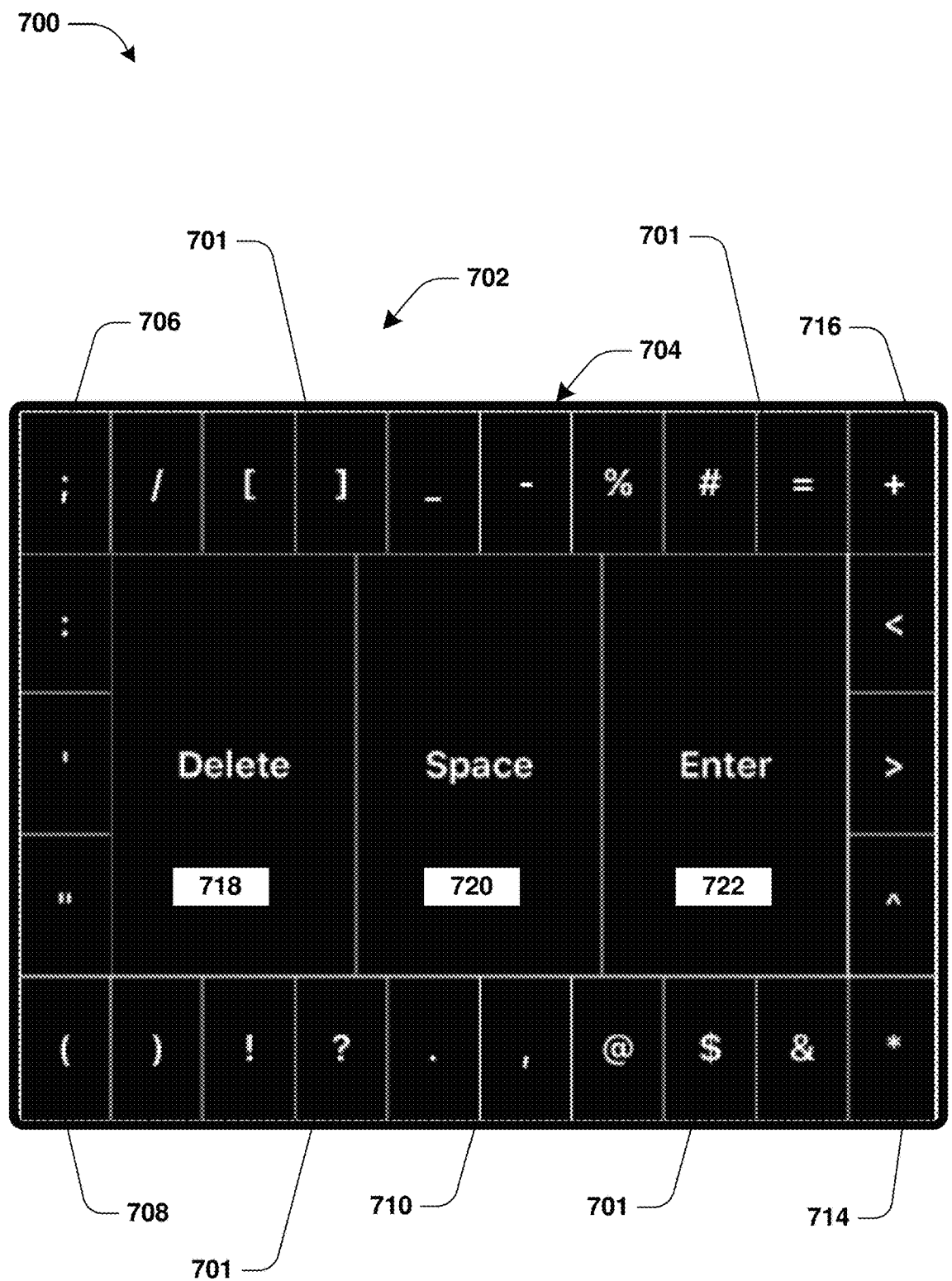
FIG. 7 is a component block diagram illustrating an example system for facilitating user input where a virtual keyboard is displayed with symbol virtual keys.

FIG. 7 illustrates an example of a system 700 for facilitating user input. For example, a user may access an email app displayed through a screen 704 of a computing device 702. A keyboard display trigger, such as the user interacting with an email creation interface of the email app, may be identified. Accordingly, a virtual keyboard 701 may be displayed. In an example, the virtual keyboard 701 may be initially populated with letter virtual keys. Responsive to receiving a swipe gesture, the virtual keyboard 701 may be transitioned to displaying symbol virtual keys. For example, the virtual keyboard 701 (e.g., a symbol virtual keyboard) may be populated with symbol virtual keys that are positioned along a periphery/edge of the screen 704 in the shape of a rectangle. In an example, the symbol virtual keys may be positioned along the rectangle so that symbol virtual keys of frequently accessed symbols such as a ; symbol, a ( symbol, a . symbol, a , symbol, a * symbol, a + symbol, etc. are in easily locatable and accessible positions such as a first corner 706, a second corner 708, a middle bottom portion 710, a third corner 714, and/or a forth corner 716 of the virtual keyboard 701. A delete virtual key 718, a space virtual key 720, and an enter virtual key 722 may be displayed within the rectangle. It may be appreciated that such keys may be displayed in various locations, orders, and/or sizes (e.g., the delete virtual key 718, the space virtual key 720, and the enter virtual key 722 may be displayed smaller so that the user can see the email app).

Figure 8:
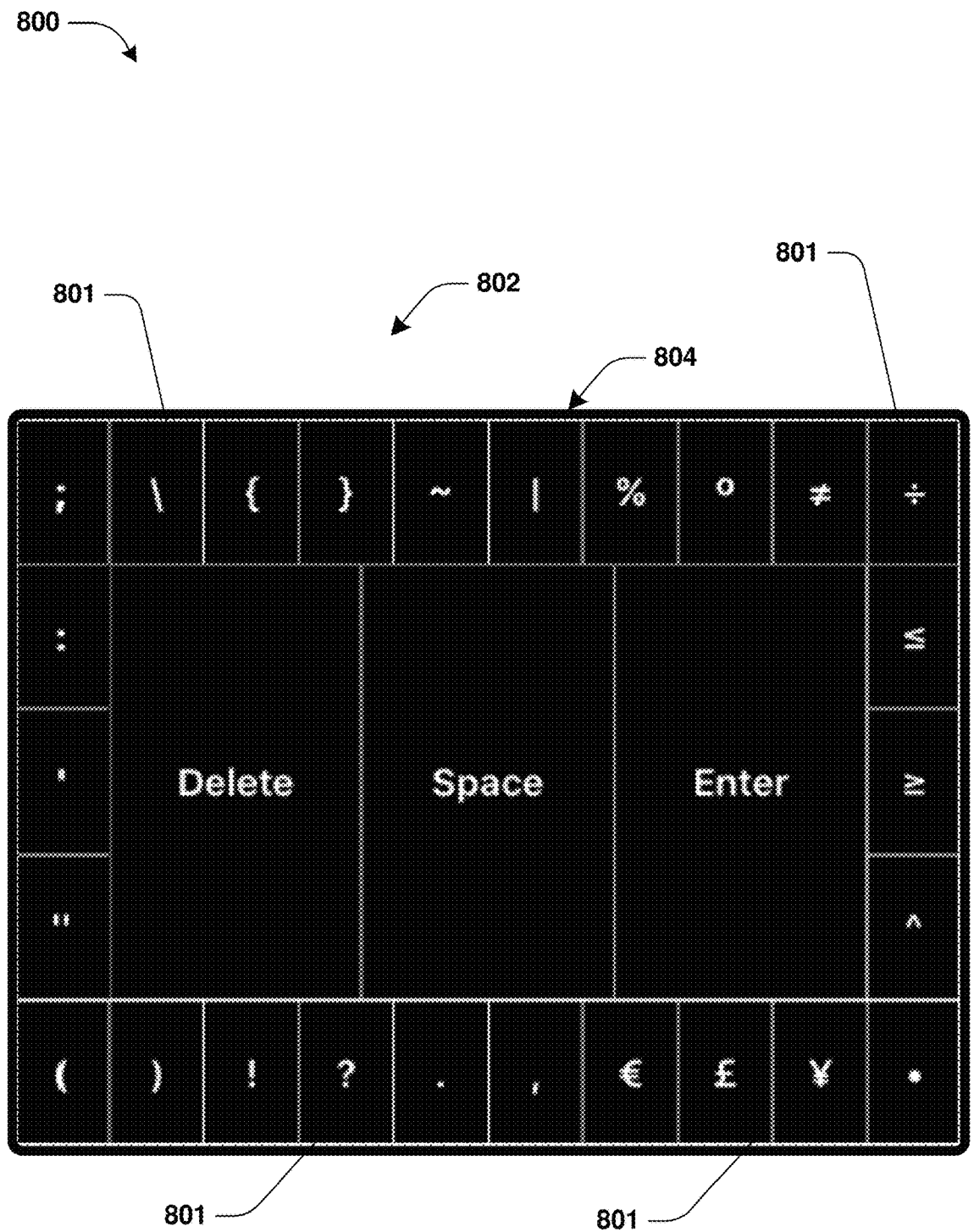
FIG. 8 is a component block diagram illustrating an example system for facilitating user input where a virtual keyboard is displayed with symbol virtual keys.

FIG. 8 illustrates an example of a system 800 for facilitating user input through a computing device 802. For example, a secondary symbol virtual keyboard 801 may be displayed through a screen 804 of the computing device 802. The secondary symbol virtual keyboard 801 may be displayed based upon a swipe gesture across the screen 804 while a different virtual keyboard was being displayed (e.g., the virtual keyboard 501 of FIG. 5, the virtual keyboard 603 of FIG. 6, the symbol virtual keyboard of FIG. 7, etc.). The secondary symbol virtual keyboard 801 may have a different set of symbol virtual keys than the symbol virtual keyboard of FIG. 7.

Figure 9:
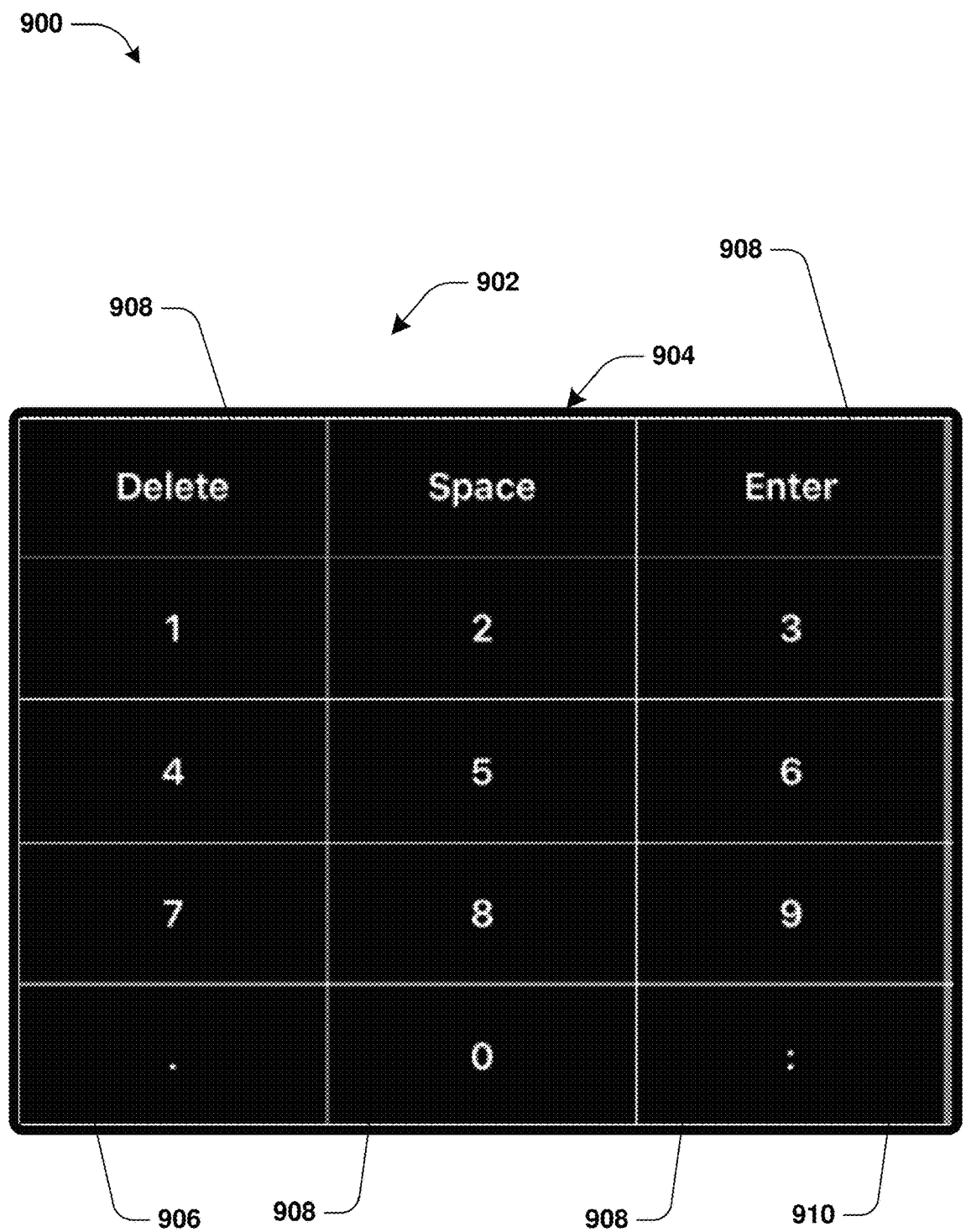
FIG. 9 is a component block diagram illustrating an example system for facilitating user input where a virtual keyboard is displayed with numeric virtual keys.

FIG. 9 illustrates an example of a system 900 for facilitating user input through a computing device 902. For example, a user may access a website displayed through a screen 904 of the computing device 902. A keyboard display trigger, such as the user interacting with an input interface of the website, may be identified. Accordingly, a virtual keyboard 908 may be displayed. The virtual keyboard 908 may be populated with numeric virtual keys and/or symbol virtual keys of symbols that are frequently used with numbers, such as a . symbol 906 and a : symbol 910. In an example, a delete virtual key, a space virtual key, and an enter virtual key may be displayed within the virtual keyboard 908.

Figure 10:
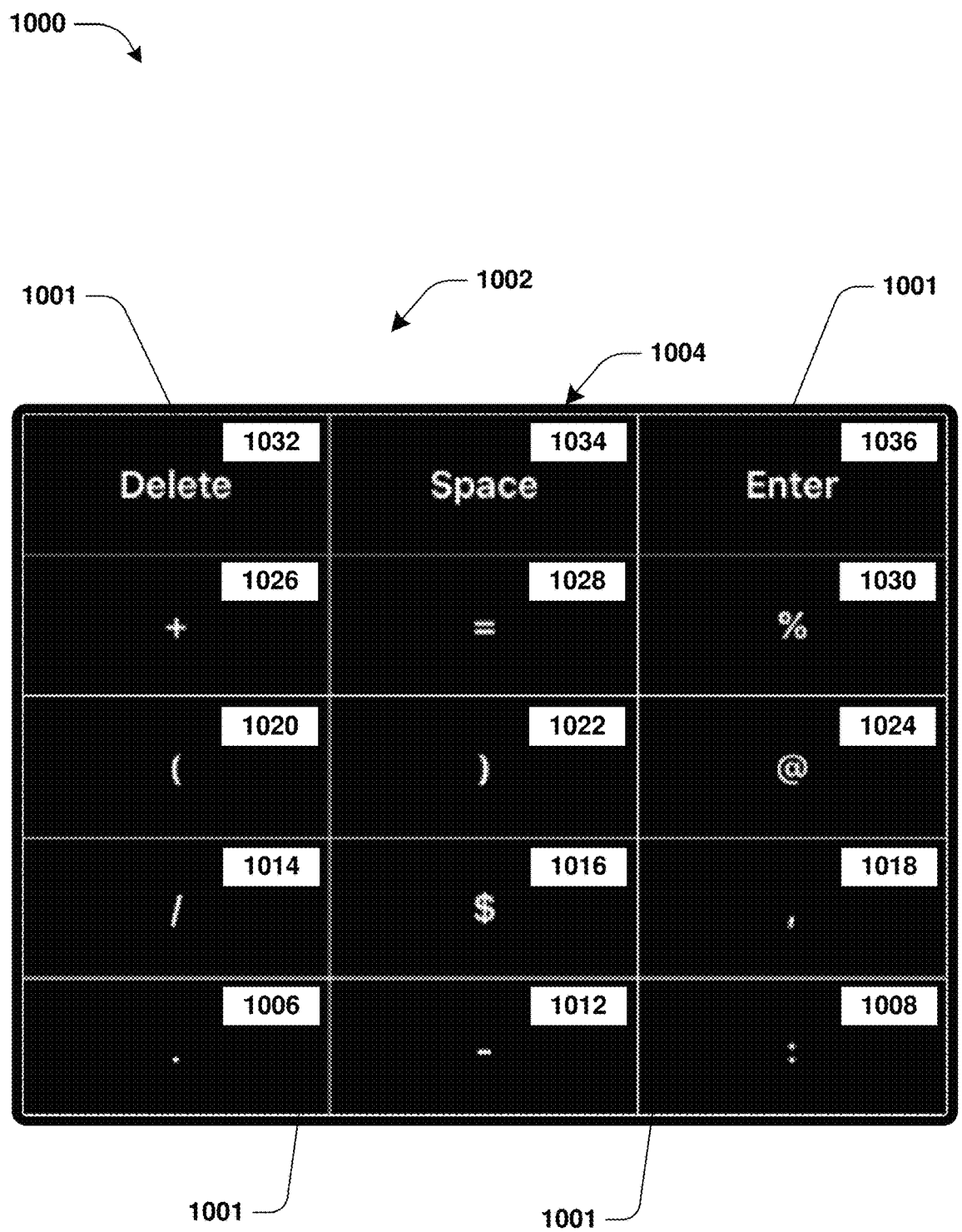
FIG. 10 is a component block diagram illustrating an example system for facilitating user input where a virtual keyboard is displayed with symbol virtual keys.

FIG. 10 illustrates an example of a system 1000 for facilitating user input through a computing device 1002. For example, a user may access a website displayed through a screen 1004 of the computing device 1002. A keyboard display trigger, such as the user interacting with an input interface of the website, may be identified. Accordingly, a virtual keyboard 1001 may be displayed. In an example, the virtual keyboard 1001 may be initially populated with numeric virtual keys (e.g., similar to the virtual keyboard 908 of FIG. 9), and may be transitioned to displaying symbol virtual keys based upon a swipe gesture across the virtual keyboard 1001. The virtual keyboard 1001 may be populated with symbol virtual keys of symbols that are frequently used with numbers, such as a + symbol 1026, an = symbol 1028, a % symbol 1030, a (symbol 1020, a ) symbol 1022, an @ symbol 1024, a / symbol 1014, a $ symbol 1016, a , symbol 1018, a . symbol 1006, a − symbol 1012, and a : symbol 1008. In an example, a delete virtual key 1032, a space virtual key 1034, and an enter virtual key 1036 may be displayed within the virtual keyboard 1001.

Figure 11A:
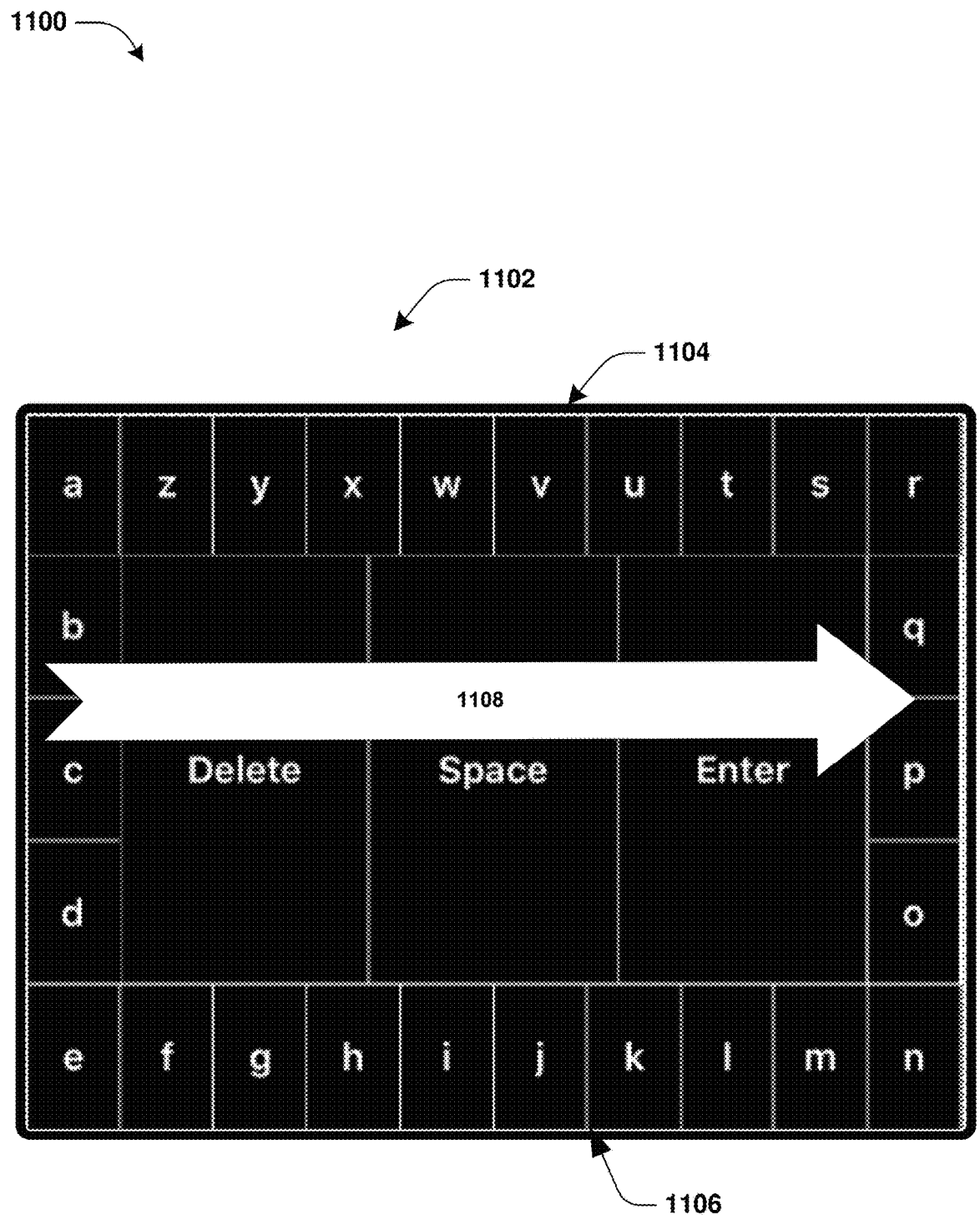
FIG. 11A is a component block diagram illustrating an example system for facilitating user input where a first virtual keyboard is displayed.
Figure 11B:
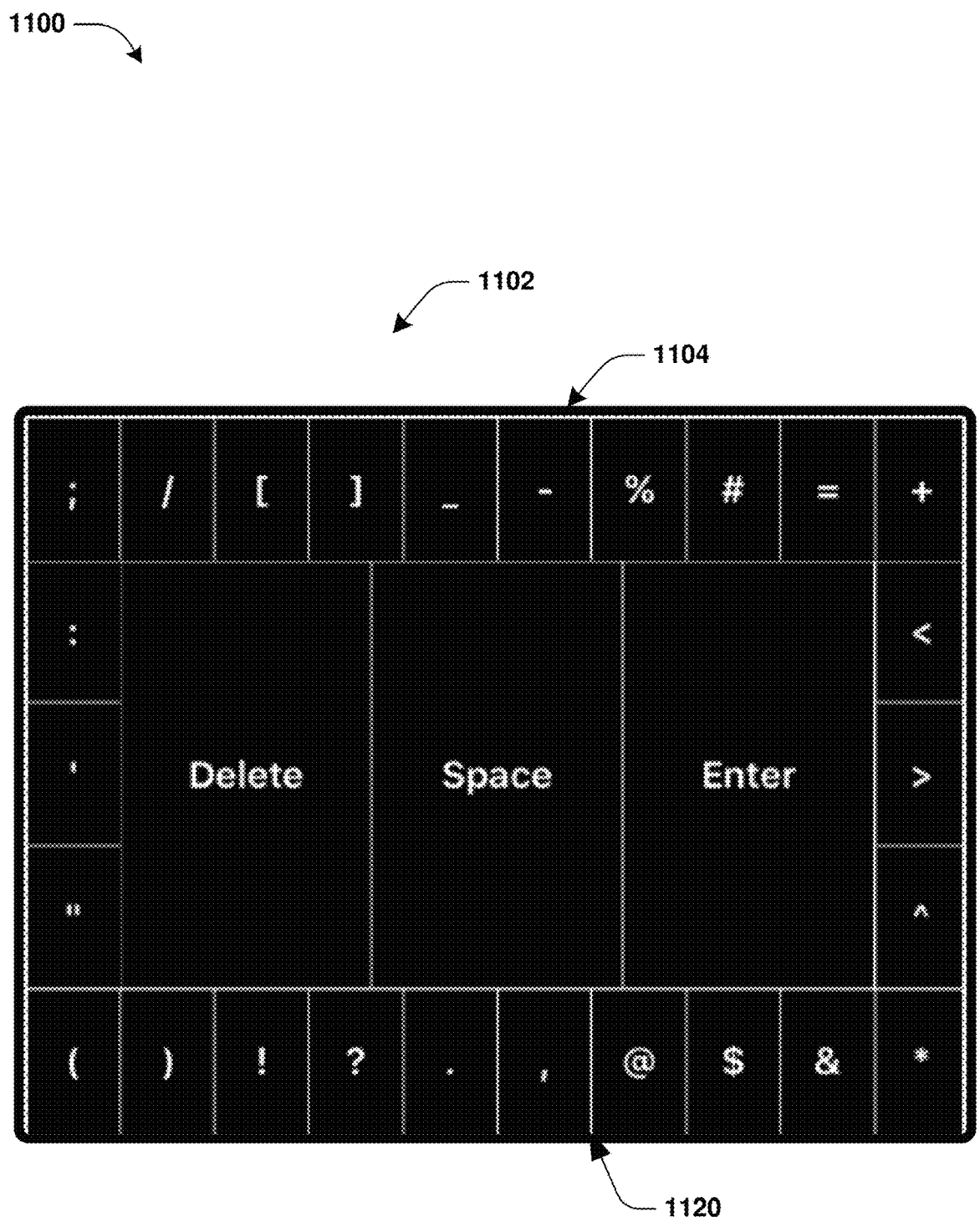
FIG. 11B is a component block diagram illustrating an example system for facilitating user input where display of a first virtual keyboard is transitioned to a second virtual keyboard based upon a swipe gesture across the first virtual keyboard.

FIGS. 11A-11B illustrate an example of a system 1100 for facilitating user input through a computing device 1102. For example, a user may access a text message app displayed through a screen 1104 of the computing device 1102. A keyboard display trigger, such as the user interacting with an input interface of the text message app, may be identified. Accordingly, a first virtual keyboard 1106 may be displayed, as illustrated in FIG. 11A. A user may perform a swipe gesture 1108 across the first virtual keyboard 1106. Instead of detecting the swipe gesture 1108 as pressing a "b" virtual key, a "c" virtual key, a delete virtual key, a space virtual key, an enter virtual key, a "q" virtual key. and/or a "p" virtual key, the swipe gesture 1108 is detected as a change keyboard event. Accordingly, display of the first virtual keyboard 1106 may be transitioned from the first virtual keyboard 1106 to a second virtual keyboard 1120, as illustrated in FIG. 11B.

Figure 12:
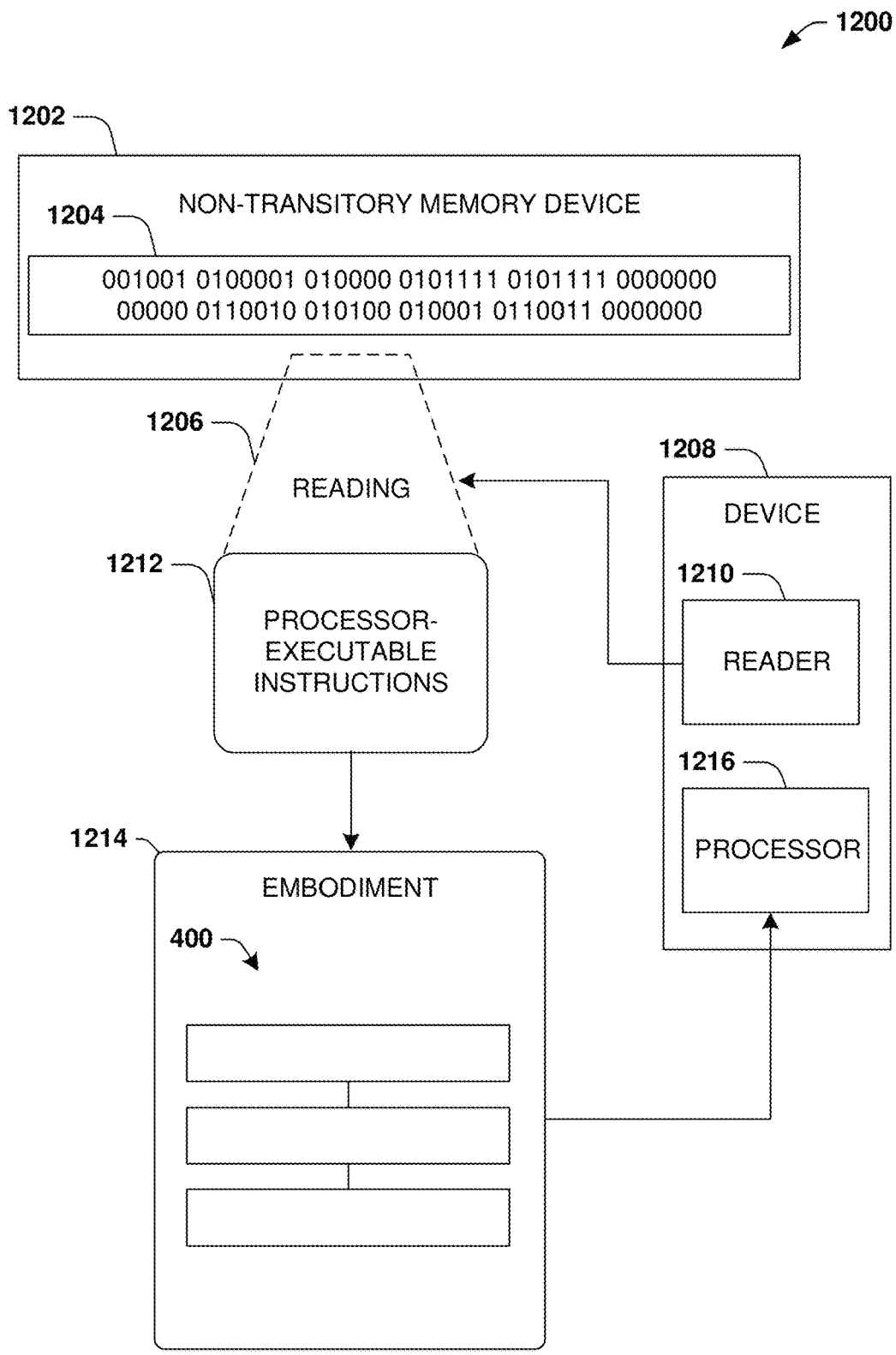
FIG. 12 is an illustration of a scenario featuring an example non-transitory machine readable medium in accordance with one or more of the provisions set forth herein.

FIG. 12 is an illustration of a scenario 1200 involving an example non-transitory machine readable medium 1202. The non-transitory machine readable medium 1202 may comprise processor-executable instructions 1212 that when executed by a processor 1216 cause performance (e.g., by the processor 1216) of at least some of the provisions herein. The non-transitory machine readable medium 1202 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1202 stores computer-readable data 1204 that, when subjected to reading 1206 by a reader 1210 of a device 1208 (e.g., a read head of a hard disk drive, or a read operation invoked on a solid-state storage device), express the processor-executable instructions 1212. In some embodiments, the processor-executable instructions 1212, when executed cause performance of operations, such as an embodiment 1214 that implements at least some of the example method 400 of FIG. 4, for example. In some embodiments, the processor-executable instructions 1212 are configured to cause implementation of a system, such as at least some of the example system 500 of FIG. 5, at least some of the example system 600 of FIG. 6, at least some of the example system 700 of FIG. 7, at least some of the example system 800 of FIG. 8, at least some of the example system 900 of FIG. 9, at least some of the example system 1000 of FIG. 10, and/or at least some of the example system 1100 of FIGS. 11A-11B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium having stored thereon processor-executable instructions that when executed cause performance of operations, the operations comprising:

identifying a keyboard display trigger event for a computing device;

displaying a social network post creation interface of a social network application via the computing device;

displaying, through the computing device in response to the keyboard display trigger event, a virtual keyboard comprising virtual keys arranged along a periphery of a screen of the computing device, wherein an application is displayed between two or more virtual keys of the virtual keyboard, wherein the virtual keys are arranged to form a parallelogram of virtual keys along the periphery of the screen, wherein a first virtual key of the virtual keys occupies a first amount of display area and a second virtual key of the virtual keys occupies a second amount of display area, different than the first amount of display area, based upon a frequency of character usage of the first virtual key relative to a frequency of character usage of the second virtual key, and wherein the frequency of character usage of the first virtual key relative to the frequency of character usage of the second virtual key is determined based upon a combination of (i) a type of a message, comprising at least one of a social message post type, a text message type or an email type, being composed using the virtual keyboard and (ii) a type of a recipient of the message;

facilitating user input to the computing device though user interaction with the virtual keyboard;

predicting a character that will be input through user interaction with the virtual keyboard, during use of the social network post creation interface of the social network application, based upon the user input and one or more frequencies of character usage associated with a type of message being composed using the virtual keyboard, wherein (i) one or more first frequencies of character usage are associated with a first type of message being composed for a first application configured to share messages with one or more users and (ii) one or more second frequencies of character usage, different than the one or more first frequencies of character usage, are associated with a second type of message being composed for a second application configured to share messages with one or more users, wherein the one or more frequencies of character usage associated with the type of message comprise at least one of the one or more first frequencies of character usage associated with the first type of message or the one or more second frequencies of character usage associated with the second type of message, based upon the predicting, changing a size of one or more virtual keys, of the virtual keyboard, associated with the character;

receiving a swipe gesture across the virtual keyboard; and transitioning from displaying the virtual keyboard to a second virtual keyboard associated with at least one type of message associated with the swipe gesture, wherein the second virtual keyboard has at least one of:

a second shape, comprising at least one of a second parallelogram, a circle, a rectangle or a cross, different than a first shape of the virtual keyboard;

a second size different than a first size of the virtual keyboard; or a second number of virtual keys different than a first number of virtual keys of the virtual keyboard.

2. The non-transitory machine readable medium of claim 1, wherein the second virtual keyboard has at least two of the second shape different than the first shape of the virtual keyboard; the second size different than the first size of the virtual keyboard; or the second number of virtual keys different than the first number of virtual keys of the virtual keyboard.

3. The non-transitory machine readable medium of claim 1, wherein the virtual keyboard comprises a first set of letter virtual keys corresponding to a first language, and the operations comprising:

receiving a second swipe gesture across the virtual keyboard, wherein the virtual keyboard comprises one or more letter virtual keys.

4. The non-transitory machine readable medium of claim 1, wherein the second virtual keyboard has the second number of virtual keys different than the first number of virtual keys of the virtual keyboard.

5. The non-transitory machine readable medium of claim 1, wherein the second virtual keyboard has the second shape different than the first shape of the virtual keyboard.

6. The non-transitory machine readable medium of claim 1, wherein the second virtual keyboard has the second size different than the first size of the virtual keyboard.

7. The non-transitory machine readable medium of claim 3, the operations comprising:

transitioning from displaying the virtual keyboard to a third virtual keyboard comprising emoji virtual keys representing emojis.

8. A computing device comprising:

a processor; and memory comprising processor-executable instructions that when executed by the processor cause performance of operations, the operations comprising:

identifying a keyboard display trigger event for the computing device;

displaying a social network post creation interface of a social network application via the computing device;

displaying, through the computing device in response to the keyboard display trigger event, a virtual keyboard comprising virtual keys arranged along a periphery of a screen of the computing device, wherein an application is displayed between two or more virtual keys of the virtual keyboard, wherein the virtual keys are arranged to form a parallelogram of virtual keys along the periphery of the screen, wherein a first virtual key of the virtual keys occupies a first amount of display area and a second virtual key of the virtual keys occupies a second amount of display area, different than the first amount of display area, based upon a frequency of character usage of the first virtual key relative to a frequency of character usage of the second virtual key, and wherein the frequency of character usage of the first virtual key relative to the frequency of character usage of the second virtual key is determined based upon a combination of (i) a type of a message, comprising at least one of a social message post type, a text message type or an email type, being composed using the virtual keyboard and (ii) a type of a recipient of the message;

facilitating user input to the computing device though user interaction with the virtual keyboard;

predicting a character that will be input through user interaction with the virtual keyboard, during use of the social network post creation interface of the social network application, based upon the user input and one or more frequencies of character usage associated with a type of message being composed using the virtual keyboard, wherein (i) one or more first frequencies of character usage are associated with a first type of message being composed for a first application configured to share messages with one or more users and (ii)

one or more second frequencies of character usage, different than the one or more first frequencies of character usage, are associated with a second type of message being composed for a second application configured to share messages with one or more users, wherein the one or more frequencies of character usage associated with the type of message comprise at least one of the one or more first frequencies of character usage associated with the first type of message or the one or more second frequencies of character usage associated with the second type of message, based upon the predicting, changing a size of one or more virtual keys, of the virtual keyboard, associated with the character;

receiving a swipe gesture across the virtual keyboard; and transitioning from displaying the virtual keyboard to a second virtual keyboard associated with at least one type of message associated with the swipe gesture, wherein the second virtual keyboard has at least one of:
  a second shape, comprising at least one of a second parallelogram, a circle, a rectangle or a cross, different than a first shape of the virtual keyboard;
  a second size different than a first size of the virtual keyboard; or
  a second number of virtual keys different than a first number of virtual keys of the virtual keyboard.

9. The computing device of claim 8, wherein the second virtual keyboard has at least two of the second shape different than the first shape of the virtual keyboard; the second size different than the first size of the virtual keyboard; or the second number of virtual keys different than the first number of virtual keys of the virtual keyboard.

10. The computing device of claim 8, wherein the virtual keyboard comprises a first set of letter virtual keys corresponding to a first language, and the operations comprising:
  receiving a second swipe gesture across the virtual keyboard, wherein the virtual keyboard comprises one or more letter virtual keys.

11. The computing device of claim 8, wherein the second virtual keyboard has the second number of virtual keys different than the first number of virtual keys of the virtual keyboard.

12. The computing device of claim 8, wherein the second virtual keyboard has the second shape different than the first shape of the virtual keyboard.

13. The computing device of claim 8, wherein the second virtual keyboard has the second size different than the first size of the virtual keyboard.

14. The computing device of claim 10, the operations comprising:
  transitioning from displaying the virtual keyboard to a third virtual keyboard comprising emoji virtual keys representing emojis.

15. A method comprising:
  identifying a keyboard display trigger event for a computing device;
  displaying a social network post creation interface of a social network application via the computing device;
  displaying, through the computing device in response to the keyboard display trigger event, a virtual keyboard comprising virtual keys arranged along a periphery of a screen of the computing device, wherein an application is displayed between two or more virtual keys of the virtual keyboard, wherein the virtual keys are arranged to form a parallelogram of virtual keys along the periphery of the screen, wherein a first virtual key of the virtual keys occupies a first amount of display area and a second virtual key of the virtual keys occupies a second amount of display area, different than the first amount of display area, based upon a frequency of character usage of the first virtual key relative to a frequency of character usage of the second virtual key, and wherein the frequency of character usage of the first virtual key relative to the frequency of character usage of the second virtual key is determined based upon a combination of (i) a type of a message, comprising at least one of a social message post type, a text message type or an email type, being composed using the virtual keyboard and (ii) a type of a recipient of the message;
  facilitating user input to the computing device though user interaction with the virtual keyboard;
  predicting a character that will be input through user interaction with the virtual keyboard, during use of the social network post creation interface of the social network application, based upon the user input and one or more frequencies of character usage associated with a type of message being composed using the virtual keyboard,
    wherein (i) one or more first frequencies of character usage are associated with a first type of message being composed for a first application configured to share messages with one or more users and (ii) one or more second frequencies of character usage, different than the one or more first frequencies of character usage, are associated with a second type of message being composed for a second application configured to share messages with one or more users,
    wherein the one or more frequencies of character usage associated with the type of message comprise at least one of the one or more first frequencies of character usage associated with the first type of message or the one or more second frequencies of character usage associated with the second type of message,
  based upon the predicting, changing a size of one or more virtual keys, of the virtual keyboard, associated with the character;
  receiving a swipe gesture across the virtual keyboard; and
  transitioning from displaying the virtual keyboard to a second virtual keyboard associated with at least one type of message associated with the swipe gesture, wherein the second virtual keyboard has at least one of:
    a second shape, comprising at least one of a second parallelogram, a circle, a rectangle or a cross, different than a first shape of the virtual keyboard;
    a second size different than a first size of the virtual keyboard; or
    a second number of virtual keys different than a first number of virtual keys of the virtual keyboard.

16. The method of claim 15, wherein the second virtual keyboard has at least two of the second shape different than the first shape of the virtual keyboard; the second size different than the first size of the virtual keyboard; or the second number of virtual keys different than the first number of virtual keys of the virtual keyboard.

17. The method of claim 15, wherein the virtual keyboard comprises a first set of letter virtual keys corresponding to a first language, and the method comprising:
  receiving a second swipe gesture across the virtual keyboard, wherein the virtual keyboard comprises one or more letter virtual keys.

18. The method of claim 15, wherein the second virtual keyboard has the second number of virtual keys different than the first number of virtual keys of the virtual keyboard.

19. The method of claim 15, wherein the second virtual keyboard has the second shape different than the first shape of the virtual keyboard.

20. The method of claim 17, comprising:
 transitioning from displaying the virtual keyboard to a third virtual keyboard comprising emoji virtual keys representing emojis.

\* \* \* \* \*